United States Patent
Watson et al.

(10) Patent No.: US 6,953,109 B2
(45) Date of Patent: Oct. 11, 2005

(54) VIBRATION ISOLATOR WITH LOW LATERAL STIFFNESS

(75) Inventors: Douglas C. Watson, Campbell, CA (US); Alton H. Phillips, Mountain View, CA (US)

(73) Assignee: Nikon Corporation (JP)

( * ) Notice: Subject to any disclaimer, the term of this patent is extended or adjusted under 35 U.S.C. 154(b) by 0 days.

(21) Appl. No.: 10/267,489

(22) Filed: Oct. 8, 2002

(65) Prior Publication Data

US 2004/0065517 A1 Apr. 8, 2004

(51) Int. Cl.⁷ .................................................. F16F 7/10
(52) U.S. Cl. ....................... 188/378; 267/136; 248/631; 355/53
(58) Field of Search .................................. 188/378, 379, 188/380; 267/136, 195, 64.27, 64.28; 248/631, 622, 636; 355/53

(56) References Cited

U.S. PATENT DOCUMENTS

| | | | | |
|---|---|---|---|---|
| 3,282,542 A | * | 11/1966 | Goodwin et al. | ............... 248/9 |
| 3,784,146 A | * | 1/1974 | Matthews | ..................... 248/20 |
| 4,360,184 A | | 11/1982 | Reid, III | |
| 5,285,995 A | | 2/1994 | Gonzalez et al. | |
| 5,570,298 A | | 10/1996 | Yasuda | |
| 5,579,084 A | * | 11/1996 | Takahashi et al. | ............ 355/53 |
| 5,660,255 A | | 8/1997 | Schubert et al. | |
| 5,701,041 A | | 12/1997 | Akutsu et al. | |
| 5,779,010 A | | 7/1998 | Nelson | |
| 5,823,307 A | | 10/1998 | Schubert et al. | |
| 5,918,862 A | | 7/1999 | Nelson | |
| 6,123,312 A | * | 9/2000 | Dai | ............................ 248/550 |
| 6,144,442 A | | 11/2000 | Mannetje et al. | |
| 6,226,075 B1 | | 5/2001 | Loopstra et al. | |
| 6,547,225 B1 | * | 4/2003 | Nelson | ..................... 267/64.27 |
| 6,568,666 B2 | * | 5/2003 | Houghton, Jr. | ............. 267/136 |
| 6,619,611 B2 | * | 9/2003 | Ryaboy et al. | .............. 248/631 |

FOREIGN PATENT DOCUMENTS

| | | |
|---|---|---|
| EP | 0973067 | 1/2000 |
| EP | 1160628 | 12/2001 |
| JP | 62-60568 | 12/1987 |
| JP | 08-287347 | 1/1996 |
| JP | 8-170689 | 7/1996 |

* cited by examiner

Primary Examiner—Robert A. Siconolfi
Assistant Examiner—Mariano Sy
(74) Attorney, Agent, or Firm—Steven G. Roeder; Jim Rose

(57) ABSTRACT

A vibration isolator (200) for isolating a first assembly (202) from vibration from a second assembly (204) includes a housing (206) that is secured to the second assembly (204) and a pendulum assembly (208). The pendulum assembly (208) includes one or more pistons (226) and a connector assembly (224). The piston (226) is coupled to the first assembly (202). The connector assembly (224) couples the piston (226) to the housing (206) and allows the piston (226) to swing laterally relative to the housing (206). The vibration isolator (200) can also include a pendulum support (264) and/or a mover (580) that moves the piston (226) and assists in supporting the load of the first assembly (202).

87 Claims, 9 Drawing Sheets

VIBRATION ISOLATOR WITH LOW LATERAL STIFFNESS

FIELD OF THE INVENTION

The present invention is directed to a vibration isolator and a method for making a vibration isolator having a relatively low lateral stiffness and/or a relatively high carrying capacity.

BACKGROUND

Exposure apparatuses are commonly used to transfer images from a reticle onto a semiconductor wafer during semiconductor processing. A typical exposure apparatus includes an apparatus frame, a measurement system, a control system, an illumination source, an optical assembly, a reticle stage assembly, and a wafer stage assembly.

The apparatus frame typically supports the measurement system, the illumination source, the reticle stage, the optical assembly, and the wafer stage above a mounting base. The measurement system monitors the positions of the stages relative to a reference such as the optical assembly. The optical assembly projects and/or focuses the light that passes through the reticle. The reticle stage assembly precisely positions the reticle relative to the optical assembly. Somewhat similarly, the wafer stage assembly precisely positions the wafer relative to the projected image from the reticle.

The size of the images and the features within the images transferred onto the wafer from the reticle are extremely small. Accordingly, the precise positioning of the wafer and the reticle relative to the optical assembly is critical to the manufacture of high density, semiconductor wafers.

Unfortunately, mechanical vibrations and deformations in the apparatus frame of the exposure apparatus can influence the accuracy of the exposure apparatus. For example, one or more movers utilized in the stage assemblies generate reaction forces that vibrate and deform the apparatus frame of the exposure apparatus. Further, the mounting base can transfer vibration to the apparatus frame.

The vibrations and deformations in the apparatus frame can move the stages and the optical assembly out of precise relative alignment. Further, the vibrations and deformations in the apparatus frame can cause the measurement system to improperly measure the relative positions of the stages. Additionally, vibration of the optical assembly can cause deformations of the optical elements within the optical assembly and degrade the optical imaging quality. As a result thereof, the accuracy of the exposure apparatus and the quality of the integrated circuits formed on the wafer can be compromised.

One attempt to solve this problem involves the use of one or more air mounts to secure the apparatus frame to the ground. The air mounts reduce the effect of vibration of the ground causing vibration to the apparatus frame. Similarly, one or more air mounts can be used to secure the components of the exposure apparatus to the apparatus frame. Unfortunately, existing air mounts have a relatively high lateral stiffness. Moreover, existing air mounts have a relatively large foot print and require a significant amount of space.

In light of the above, there is a need for an exposure apparatus with an improved isolation system. Additionally, there is a need for a vibration isolator having relatively high lateral flexibility. Moreover, there is a need for a vibration isolator having a relatively small footprint. Further, there is a need for an exposure apparatus capable of manufacturing precision devices, such as high density, semiconductor wafers.

SUMMARY

The present invention is directed to a vibration isolator for isolating a first assembly from vibration from a second assembly along a first axis. The vibration isolator includes a housing that is secured to the second assembly, a pendulum assembly that is coupled to the housing, and a mover. The pendulum assembly includes a connector assembly, a sleeve, a first piston, a first piston seal and a pendulum support. The first piston is secured to the first assembly and the connector assembly flexibly connects the sleeve to the housing and allows the sleeve and first piston to swing laterally relative to the first axis. The first piston seal flexibly seals the first piston to the sleeve. Further, the pendulum support flexibly secures the sleeve to the first piston. The pendulum support assists in supporting the mass of the sleeve while allowing the first piston to move relative to the sleeve. With this design, the vibration isolator has relatively good lateral damping.

In one embodiment, the first piston swings laterally relative to the first axis along an arc shaped path during lateral movement of the first assembly. Further, the first piston moves substantially parallel to the first axis.

In other embodiments, the vibration isolator includes a second piston and/or a mover that is coupled to the first piston. With these designs, the vibration isolator has a relatively small footprint and a relatively large capacity.

The vibration isolator is particularly useful as part of an exposure apparatus. For example, one or more vibration isolators can be used as part of a frame isolation system that secures a frame assembly of the exposure apparatus to a mounting base. With this design, the frame isolation system reduces the effect of vibration of the mounting base causing vibration on the frame assembly and the components that are secured to the frame assembly.

Further, one or more of the vibration isolators can be used to secure one or more other assemblies of the exposure apparatus to the frame assembly. For example, one or more vibration isolators could be used as part of an isolation system to secure a stage assembly or an optical assembly to the frame assembly.

The present invention is also directed to a device made with the exposure apparatus, a wafer made with the exposure apparatus, a method for making a vibration isolator, a method for making an isolation system, a method for making an exposure apparatus, a method for making a device, and a method for making a wafer.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
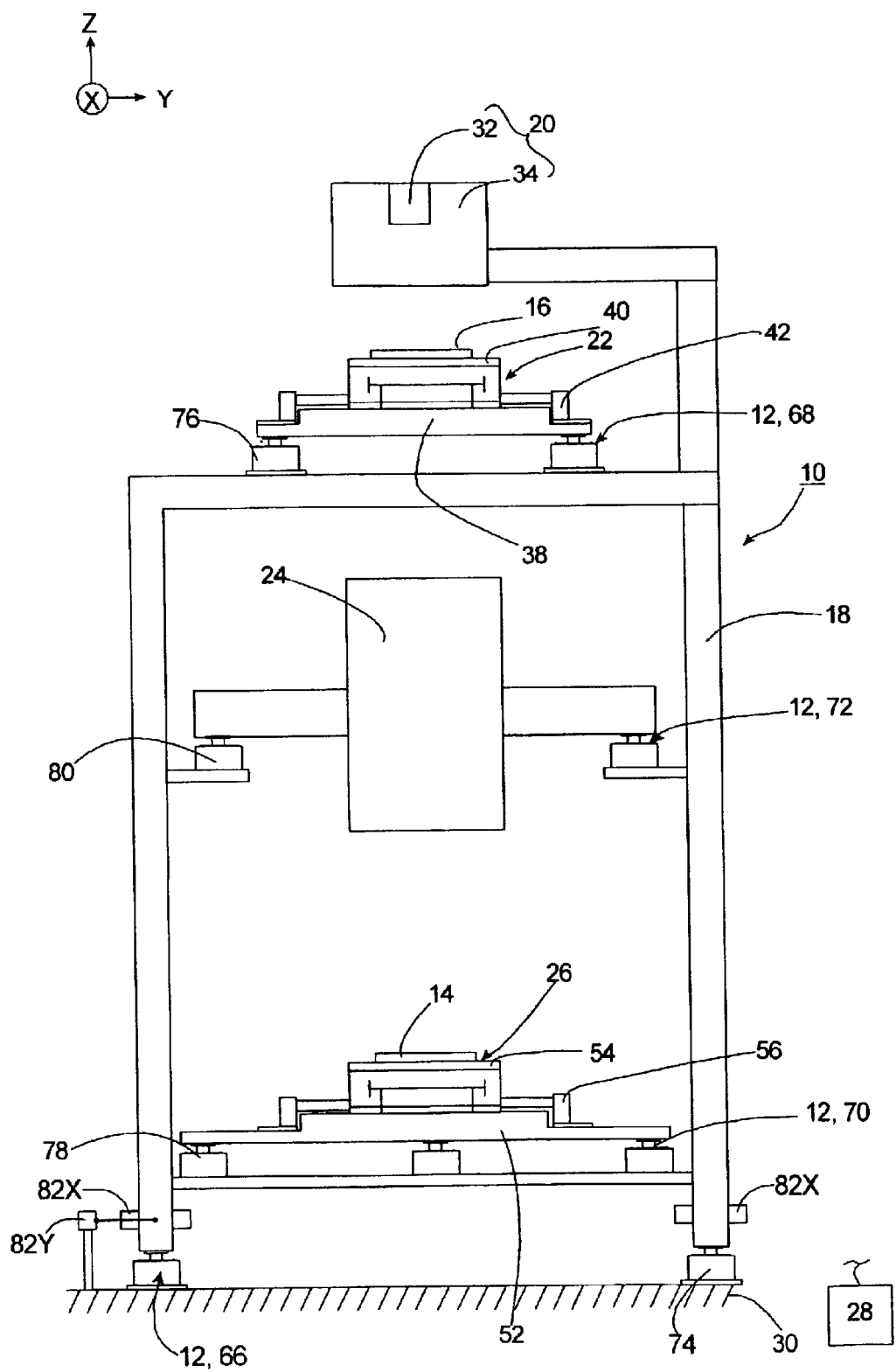
FIG. 1 is a side illustration of an exposure apparatus having features of the present invention.

FIG. 1 illustrates an apparatus 10 that includes one or more isolation assemblies 12 that isolate the apparatus 10 or a portion of the apparatus 10 from vibration. The type of apparatus 10 can be varied. For example, the apparatus 10 can be used to manufacture, measure and/or inspect a device 14. The type of device 14 manufactured or inspected by the apparatus 10 can be varied. For example, the device 14 can be a semiconductor wafer, and the isolation assemblies 12 can be used as part of an exposure apparatus 10 that precisely transfers an image of an integrated circuit from an object 16 such as a reticle onto the semiconductor wafer 14.

Some of the Figures provided herein include a coordinate system that designates an X axis, a Y axis that is orthogonal to the X axis, and a Z axis that is orthogonal to the X axis and the Y axis. It should be understood that the coordinate system is merely for reference and can be varied. These axes are also referred to as a first axis, a second axis, and a third axis.

The exposure apparatus 10 illustrated in FIG. 1 also includes a frame assembly 18, an illumination system 20 (irradiation apparatus), a reticle stage assembly 22, a projection optical assembly 24, a wafer stage assembly 26, and a control system 28. The exposure apparatus 10 mounts to a mounting base 30, e.g., the ground, a base, or floor or some other supporting structure.

There are a number of different types of exposure apparatuses 10. For example, the exposure apparatus 10 can be used as scanning type photolithography system that exposes the pattern from the reticle 16 onto the wafer 14 with the reticle 16 and the wafer 14 moving synchronously. In a scanning type lithographic device, the reticle 16 is moved perpendicular to an optical axis of the projection optical assembly 24 by the reticle stage assembly 22 and the wafer 14 is moved perpendicular to the optical axis of the projection optical assembly 24 by the wafer stage assembly 26. Scanning of the reticle 16 and the wafer 14 occurs while the reticle 16 and the wafer 14 are moving synchronously.

Alternately, the exposure apparatus 10 can be a step-and-repeat type photolithography system that exposes the reticle 16 while the reticle 16 and the wafer 14 are stationary. In the step and repeat process, the wafer 14 is in a constant position relative to the reticle 16 and the projection optical assembly 24 during the exposure of an individual field. Subsequently, between consecutive exposure steps, the wafer stage assembly 26 consecutively moves the wafer 14 perpendicular to the optical axis of the projection optical assembly 24 so that the next field of the wafer 14 is brought into position relative to the projection optical assembly 24 and the reticle 16 for exposure. Following this process, the images on the reticle 16 are sequentially exposed onto the fields of the wafer 14 so that the next field of the wafer 14 is brought into position relative to the projection optical assembly 24 and the reticle 16.

However, the use of the exposure apparatus 10 and the isolation assemblies 12 is not limited to a photolithography system for semiconductor manufacturing. The apparatus 10, for example, can be used as an LCD photolithography system that exposes a liquid crystal display device pattern onto a rectangular glass plate or a photolithography system for manufacturing a thin film magnetic head. Further, the present invention can also be applied to a proximity photolithography system that exposes a mask pattern by closely locating a mask and a substrate without the use of a projection optical assembly. Additionally, the present invention provided herein can be used in other devices, including other semiconductor processing equipment.

The frame assembly 18 is rigid and supports the components of the exposure apparatus 10. The design of the frame assembly 18 can be varied to suit the design requirements for the rest of the exposure apparatus 10. The frame assembly 18 illustrated in FIG. 1 supports the projection optical assembly 24, the illumination system 20, the reticle stage assembly 22 and the wafer stage assembly 26 above the mounting base 30.

The illumination system 20 includes an illumination source 32 and an illumination optical assembly 34. The illumination source 32 emits the beam (irradiation) of light energy. The illumination source 32 can be g-line (436 nm), i-line (365 nm), KrF excimer laser (248 nm), ArF excimer laser (193 nm) and $F_2$ laser (157 nm). Alternately, the illumination source 32 can also use charged particle beams such as an x-ray and electron beam. For instance, in the case where an electron beam is used, thermionic emission type lanthanum hexaboride ($LaB_6$) or tantalum (Ta) can be used as an electron gun. Furthermore, in the case where an electron beam is used, the structure could be such that either a mask is used or a pattern can be directly formed on a substrate without the use of a mask.

The illumination optical assembly 34 guides the beam of light energy from the illumination source 32 to the reticle 16. The beam illuminates selectively different portions of the reticle 16 and exposes the semiconductor wafer 14. In FIG. 1, the illumination source 32 is illustrated as being supported above the reticle stage assembly 22. Typically, however, the illumination source 32 is secured to one of the sides of the frame assembly 18 and the energy beam from the illumination source 32 is directed to above the reticle 16 with the illumination optical assembly 34.

The reticle stage assembly 22 holds and positions the reticle 16 relative to the optical assembly 24 and the wafer 14. In FIG. 1, the reticle stage assembly 22 includes a reticle stage base 38, a reticle stage 40, and a reticle stage mover assembly 42. The reticle stage base 38 supports the reticle stage 40 above the mounting base 30. The reticle stage 40 retains the reticle 16. A bearing (not shown) allows for motion of the reticle stage 40 relative to the reticle stage base 38. The reticle stage mover assembly 42 includes one or more movers that move the reticle stage 40 relative to the reticle stage base 38. As provided herein, each of the movers can include one or more rotary motors, voice coil motors, linear motors, electromagnetic actuators, or some other force actuators.

The reticle stage assembly 22 can include a reticle measurement system (not shown) that monitors the position of the reticle stage 40 relative to the projection optical assembly 24 or some other reference. For example, the reticle measurement system can utilize laser interferometers, encoders, sensors, and/or other measuring devices.

The projection optical assembly 24 projects, directs and/or focuses the beam of light energy passing through the projection optical assembly 24. The design of the projection optical assembly 24 can be varied according to its design requirements. For example, the projection optical assembly 24 can magnify or reduce the image to be illuminated onto the device 14. The projection optical assembly 24 need not be limited to a magnification or a reduction system. The projection optical assembly 24 could also be a 1× system.

With respect to the projection optical assembly 24, when far ultra-violet rays such as the excimer laser is used, glass materials such as quartz and fluorite that transmit far ultra-violet rays is preferable to be used. When the $F_2$ type laser or x-ray is used, the projection optical assembly 24 should preferably be either catadioptric or refractive (a reticle should also preferably be a reflective type), and when an electron beam is used, electron optics should preferably consist of electron lenses and deflectors. The optical path for the electron beams should be in a vacuum.

Also, with an exposure device 10 that employs vacuum ultra-violet radiation (VUV) of wavelength 200 nm or lower, use of the catadioptric type optical system can be considered. Examples of the catadioptric type of optical system include the disclosure Japan Patent Application Disclosure No.8-171054 published in the Official Gazette for Laid-Open Patent Applications and its counterpart U.S. Pat. No. 5,668,672, as well as Japan Patent Application Disclosure No.10-20195 and its counterpart U.S. Pat. No. 5,835,275. In these cases, the reflecting optical device can be a catadioptric optical system incorporating a beam splitter and concave mirror. Japan Patent Application Disclosure No.8-334695 published in the Official Gazette for Laid-Open Patent Applications and its counterpart U.S. Pat. No. 5,689,377 as well as Japan Patent Application Disclosure No.10-3039 and its counterpart U.S. patent application Ser. No. 873,605 (Application Date: Jun. 12, 1997) also use a reflecting-refracting type of optical system incorporating a concave mirror, etc., but without a beam splitter, and can also be employed with this invention. As far as is permitted, the disclosures in the above-mentioned U.S. patents, as well as the Japan patent applications published in the Official Gazette for Laid-Open Patent Applications are incorporated herein by reference.

The wafer stage assembly 26 holds and positions the wafer 14 with respect to the adjusted projected image of the illuminated portions of the reticle 16. In the embodiment illustrated in FIG. 1, the wafer stage assembly 26 includes a wafer stage base 52, a wafer stage 54, and a wafer stage mover assembly 56. The wafer stage base 52 supports the wafer stage 54 above the mounting base 30. The wafer stage 54 retains the wafer 14. A bearing such as an air bearing (not shown) allows for motion of the wafer stage 54 relative to the wafer stage base 52. The wafer stage mover assembly 56 includes one or more movers that move the wafer stage 54 relative to the wafer stage base 52. As provided herein, each of the movers can include one or more rotary motors, voice coil motors, linear motors, electromagnetic actuators, or some other force actuators.

The wafer stage assembly 26 can include a wafer measurement system (not shown) that monitors the position of the wafer stage 54 relative to the projection optical assembly 24 or some other reference. For example, the wafer measurement system can utilize laser interferometers, encoders, sensors, and/or other measuring devices.

Further, in photolithography systems, when linear motors (see U.S. Pat. No. 5,623,853 or U.S. Pat. No. 5,528,118) are used in a wafer stage assembly or a reticle stage assembly, the linear motors can be either an air levitation type employing air bearings or a magnetic levitation type using Lorentz force or reactance force. Additionally, the stage could move along a guide, or it could be a guideless type stage that uses no guide. As far as is permitted, the disclosures in U.S. Pat. Nos. 5,623,853 and 5,528,118 are incorporated herein by reference.

Alternatively, one of the stages could be driven by a planar motor, which drives the stage by an electromagnetic force generated by a magnet unit having two-dimensionally arranged magnets and an armature coil unit having two-dimensionally arranged coils in facing positions. With this type of driving system, either the magnet unit or the armature coil unit is connected to the stage and the other unit is mounted on the moving plane side of the stage.

Movement of the stages as described above generates reaction forces that can affect performance of the photolithography system. Reaction forces generated by the wafer (substrate) stage motion can be mechanically released to the floor (ground) by use of a frame member as described in U.S. Pat. No. 5,528,118 and published Japanese Patent Application Disclosure No. 8-166475. Additionally, reaction forces generated by the reticle (mask) stage motion can be mechanically released to the floor (ground) by use of a frame member as described in U.S. Pat. No. 5,874,820 and published Japanese Patent Application Disclosure No. 8-330224. As far as is permitted, the disclosures in U.S. Pat. Nos. 5,528,118 and 5,874,820 and Japanese Patent Application Disclosure No. 8-330224 are incorporated herein by reference.

Each isolation assembly 12 partly isolates a first assembly from vibration of a second assembly along at least one axis. Stated another way, each isolation assembly 12 inhibits vibration from the second assembly from being transferred to the first assembly. In the embodiment illustrated in FIG. 1, the exposure apparatus 10 includes a frame stage isolation system 66, a reticle stage isolation system 68, a wafer stage isolation system 70, and an optical isolation system 72. The design of each isolation assembly 12 can be varied to suit the design requirements of the apparatus 10.

In this embodiment, the frame isolation system 66 secures the frame assembly 18 to the mounting base 30. With this design, the frame isolation system 66 reduces the effect of vibration of the mounting base 30 (the second assembly) causing vibration on the frame assembly 18 (the first assembly) and the components of the exposure apparatus 10 that are secured to the frame assembly 18. In this embodiment, the frame isolation system 66 includes a plurality of spaced apart vibration isolators 74 that support the weight of the frame assembly 18, while allowing for movement of the frame assembly 18 laterally relative to the mounting base 30. The number of vibration isolators 74 in the frame isolation system 66 can be varied. For example, the frame isolation system 66 can include three spaced apart vibration isolators 74.

Further, in this embodiment, the frame isolation system 66 moves and positions the frame assembly 18 relative to the mounting base 30 base with six degrees of freedom. More specifically, the vibration isolators 74 adjust the position of the frame assembly 18 relative to the mounting base 30 along the Z axis, about the X axis and about the Y axis. Additionally, the frame isolation system 66 includes one or more movers for adjusting the position of the frame assembly 18 relative to the mounting base 30 along the X axis, along the Y axis and about the Z axis. In FIG. 1, the frame isolation system 66 includes (i) two spaced apart X movers 82X that move the frame assembly 18 relative to the mounting base 30 along the X axis and about the Z axis, and (ii) a Y mover 82Y that moves the frame assembly 18 relative to the mounting base 30 along the Y axis.

The design of each mover 82X, 82Y can be varied to suit the movement requirements of the apparatus 10. As provided herein, each of the movers 82X, 82Y can include one or more rotary motors, voice coil motors, linear motors, electromagnetic actuators, or some other force actuators. In the embodiment illustrated in FIG. 1, each of the movers 82X, 82Y is a voice coil motor. Electrical current (not shown) is individually supplied to each mover 82X, 82Y by the control system 28 to precisely position the frame assembly 18.

In one embodiment, the control system 28 is connected to the vibration isolators 74 and actively controls the vibration isolators 74 to compensate for low frequency disturbances such as a shift in the center of gravity in one of the stage assemblies 22, 26. Further, each vibration isolator 74 can include a Z mover (not shown) that moves the frame assembly 18 relative to the mounting base 30 along the Z axis and about the X axis and Y axis. In this case, the Z mover may be disposed so that the drive force of the Z mover and the support force (isolator axis) of the vibration isolator of the present invention that will be explained hereinafter are on the same axis.

The position and acceleration of the frame assembly 18 relative to the mounting base 30 can be monitored with one or more position and/or acceleration sensors that are connected to the control system 28 (not shown). With information from the sensors, the control system 28 can control the frame isolation system 66 to adjust and control the position of the frame assembly 18 relative to the mounting base 30.

The reticle stage isolation system 68 secures and supports the reticle stage base 38 to the frame assembly 18 and reduces the effect of vibration of the frame assembly 18 (second assembly) causing vibration to the reticle stage base 38 (first assembly). In this embodiment, the reticle stage isolation system 68 includes a plurality of spaced apart vibration isolators 76 that are connected to the control system 28 and support the weight of the reticle stage base 38 and adjust the position of the reticle stage base 38 with three degrees of freedom, while retaining relatively low lateral and vertical stiffness for good passive vibration isolation of the reticle stage base 38 relative to the frame assembly 18. Alternately, the reticle stage isolation system 68 can be designed to move the reticle stage base 38 with six degrees of freedom.

In this embodiment, the control system 28 actively controls the vibration isolators 76 to compensate for low frequency disturbances to adjust the static or low frequency position of the reticle stage base 38, to improve vibration isolation by reducing the stiffness, and/or to compensate for a change or shift in the center of gravity of the reticle stage assembly 22. In one embodiment, the position and acceleration of the reticle stage base 38 can be monitored with one or more position and/or acceleration sensors that are connected to the control system 28 (not shown). With information from the sensors, the control system 28 can cooperate with the reticle stage isolation system 68 to adjust and control the position of the reticle stage base 38.

The wafer stage isolation system 70 secures and supports the wafer stage base 52 to the frame assembly 18 and reduces the effect of vibration of the frame assembly 18 (second assembly) causing vibration to the wafer stage base 52 (first assembly). The wafer stage isolation system 70 is similar to the reticle stage isolation system 68 discussed above. In this embodiment, the wafer stage isolation system 70 includes a plurality of spaced apart vibration isolators 78 connected to the control system 28 and the control system 28 actively controls vibration isolators 78 to adjust the static or low frequency position of the wafer stage base 52, to adjust the position of the wafer stage base 52 with three degrees of freedom and to improve vibration isolation by reducing the stiffness, and/or to compensate for a change or shift in the center of gravity of the wafer stage assembly 26. Alternately, the wafer stage isolation system 70 can be designed to move the wafer stage base 52 with six degrees of freedom. The position and acceleration of the wafer stage base 52 can be monitored with one or more position and/or acceleration sensors (not shown) that are connected to the control system 28. With information from the sensors, the control system 28 can cooperate with the wafer stage isolation system 70 to adjust and control the position of the wafer stage base 52.

The optical isolation system 72 secures and supports the projection optical assembly 24 relative to the frame assembly 18 and reduces the effect of vibration of the frame assembly 18 (second assembly) causing vibration to the projection optical assembly 24 (first assembly). The optical isolation system 72 is similar to the other isolation systems discussed above. In this embodiment, the optical isolation system 72 includes a plurality of spaced apart vibration isolators 80 connected to the control system 28 and the control system 28 actively controls vibration isolators 80 to position the optical assembly 24, to compensate for low frequency disturbances, to adjust the static or low frequency position of the optical assembly 24 and to improve vibration isolation by reducing stiffness. The position and acceleration of the projection optical assembly 24 can be monitored with one or more position and/or acceleration sensors (not shown) that are connected to the control system 28. With information from the sensors, the control system 28 can cooperate with the optical isolation system 72 to adjust and control the position of the projection optical assembly 24.

Figure 2A:
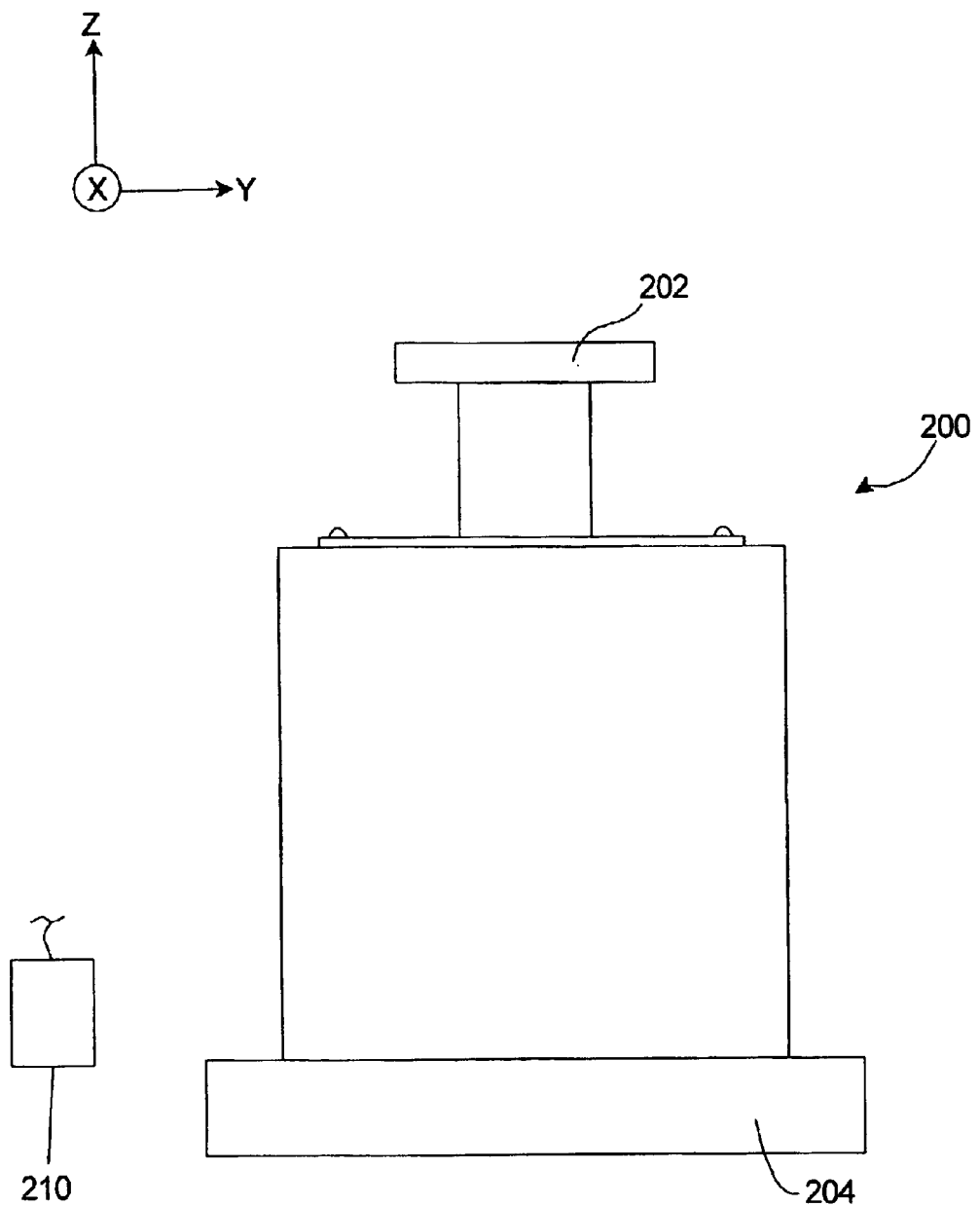
FIG. 2A is a side view of a first embodiment of a vibration isolator having features of the present invention.

FIG. 2A is a side view of one embodiment of a vibration isolator 200 that can be used in the isolation systems 66, 68, 70, 72 of FIG. 1. In this embodiment, the vibration isolator 200 isolates a first assembly 202 from vibration from a second assembly 204 along a first axis, e.g. the Z axis and transverse to the first axis. Stated another way, the vibration isolator 200 attenuates vibration transmission from the second assembly 204 to the first assembly 202. As provided herein, the vibration isolator 200 can partly or substantially completely attenuate vibration transmission.

Figure 2B:
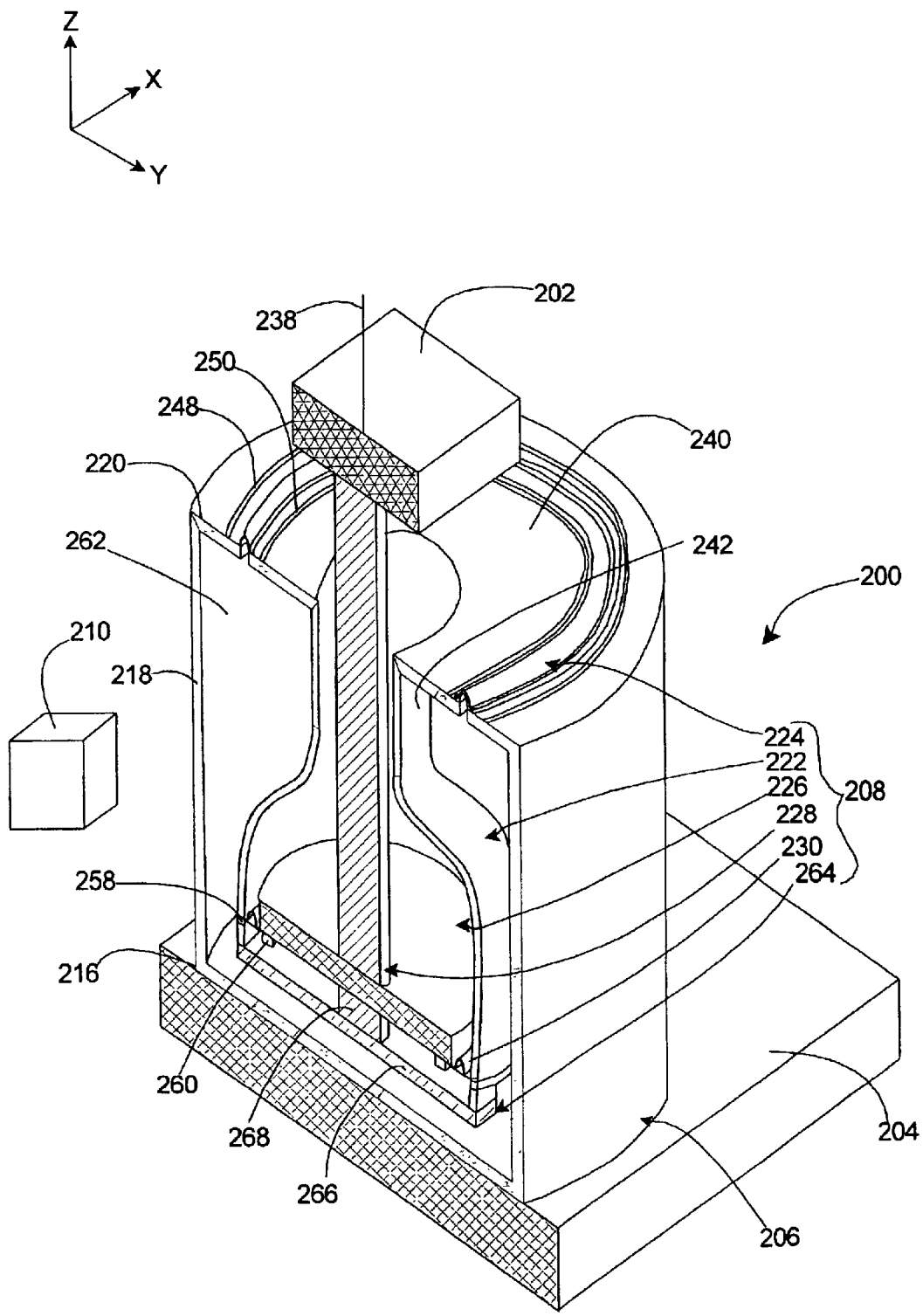
FIG. 2B is a cut-away perspective view of the vibration isolator of FIG. 2A.

FIG. 2B illustrates a cut-away perspective view of the vibration isolator 200, the first assembly 202 and the second assembly 204 of FIG. 2A. In this embodiment, the vibration isolator 200 includes a housing 206, a pendulum assembly 208, and a fluid source 210. The design of these components can be varied to suit the design requirements of the vibration isolator 200.

The housing 206 is secured to and couples the second assembly 204 to the vibration isolator 200. In FIG. 2B, the housing 206 includes a housing bottom wall 216, a housing side wall 218, and a housing top wall 220. In FIG. 2B, the housing bottom wall 216 is generally disk shaped, is secured to the second assembly 204, and is positioned at the bottom of the housing 206. The housing side wall 218 is generally annular tube shaped and extends upward from the housing bottom wall 216. The housing top wall 220 is generally annular disk shaped, is secured to the top of the housing side wall 218, and extends inward from the housing side wall 218.

The housing bottom wall 216 and the housing side wall 218 can be formed as a unit and the housing top wall 220 can be secured and sealed to the housing side wall 218. The size, shape and orientation of the walls 216, 218, 220 can be varied. For example, the housing bottom wall 216 can be flat plate shaped, the housing side wall 218 can be generally square tube shaped, and the housing top wall 220 can be flat plate shaped and include an aperture. Still alternately, for example, the housing 206 could be orientated so that the housing top wall 220 is positioned below the housing bottom wall 216.

The pendulum assembly 208 allows for lateral movement of the first assembly 202 relative to the second assembly 204. In FIG. 2B, the pendulum assembly 208 includes a sleeve 222, a connector assembly 224, a piston 226, a piston shaft 228, and a piston seal 230.

The sleeve 222 allows the piston 226 to be positioned below the housing top wall 220. In FIG. 2B, the sleeve 222 is somewhat bell shaped and is centered and aligned along an isolator axis 238. In this embodiment, the sleeve 222 includes (i) a sleeve top wall 240 that is annular shaped and (ii) a sleeve side wall 242 that extends downward from the sleeve top wall 240. The sleeve side wall 242 includes an upper section that is generally annular tube shaped, an intermediate section that is generally tapered tube shaped and a lower section that is generally annular tube shaped and has an outer diameter and an inner diameter that are greater than that of the upper section. Alternately, for example, the sleeve 222 can be generally rectangular tube shaped.

The connector assembly 224 flexibly connects the sleeve 222 to the housing 206 and allows the sleeve 222 and the rest of the pendulum assembly 208 to move, pivot and/or swing relative to the housing 206 and the second assembly 204. In FIG. 2B, the connector assembly 224 connects and seals the sleeve top wall 240 to the top housing wall 220, with the sleeve 222 extending and cantilevering downward.

In FIG. 2B, the connector assembly 224 is an annular shaped, convoluted diaphram seal that includes an annular convolution that allows the sleeve 222 and the rest of the pendulum assembly 208 to move without deforming the rest of the seal. The convolution in the seal rolls up and down to allow the sleeve 222 to move relative to the housing 206 without deforming the rest of the seal. This type of seal allows for vertical (along isolator axis 238) and tilt (about an axis perpendicular to the isolator axis 238) movement with minimal resistance. Alternately, other types of seals can be utilized that allow for greater lateral flexibility. For example, ferro fluidic seals and/or air/vacuum bearing seals can be utilized.

In FIG. 2B, a housing clamp 248 seals an outer perimeter of the seal to the housing top wall 220 and an upper sleeve clamp 250 seals an inner perimeter of the seal to the sleeve top wall 240. In this embodiment, each clamp 248, 250 is an annular shaped ring. A plurality of fasteners (not shown) can be used to secure the housing clamp 248 to the housing 206 and a plurality of fasteners (not shown) can be used to secure the upper sleeve clamp 250 to the sleeve 222. Alternately, the connector assembly 224 can be secured in another fashion, e.g. an adhesive to the housing 206 and the sleeve 222.

The piston 226 is coupled to and supports the first assembly 202. Further, the piston 226 moves within and relative to the sleeve 222 along the isolator axis 238. In FIG. 2B, the piston 226 is generally disk shaped and has a generally circular shaped cross section. The diameter of the piston 226 is less than the inner diameter of the sleeve 222 at the sleeve bottom section. However, alternate shapes of the piston 226 can be utilized.

The piston shaft 228 mechanically connects the piston 226 to the first assembly 202. As a result thereof, the piston 226 and the piston shaft 228 move concurrently and are connected together to the first assembly 202. In FIG. 2B, the piston shaft 228 extends from the top of the piston 226 to the bottom of the first assembly 202. In this embodiment, the bottom of the piston shaft 228 is fixedly connected to the top of the piston 226, and the piston shaft 228 is a rigid rod that extends and cantilevers upward toward the first assembly 202 along the isolator axis 238.

It should be noted that the length of the piston shaft 228 and the length of the sleeve 222 can be changed to adjust the lateral stiffness of the vibration isolator 200.

The piston seal 230 secures and seals the piston 226 to the sleeve 222 and allows the piston 226 to move relative to the sleeve 222. In FIG. 2B, the piston seal 230 is a convoluted diaphragm made of a resilient material such as rubber. The convolution in the piston seal 230 rolls up and down to allow the piston 226 to move relative to the sleeve 222 without deforming the rest of the piston seal 230. Alternately, other types of seals can be utilized that allow for greater lateral flexibility. For example, ferro fluidic seals and/or air/vacuum bearing seals can be utilized.

The bottom of the piston 226 and the bottom of the sleeve 222 are secured to the top of the piston seal 230. In this embodiment, a second sleeve clamp 258 seals an outer perimeter of the piston seal 230 to the bottom of the sleeve 222 and a piston clamp 260 seals an inner perimeter of the piston seal 230 to the piston 226. In this embodiment, each clamp 258, 260 is an annular shaped ring. A plurality of fasteners (not shown) can be used to secure the lower sleeve clamp 258 to the sleeve 222 and a plurality of fasteners (not shown) can be used to secure the piston clamp 260 to the piston 226. Alternately, the piston seal 230 can be secured in another fashion, e.g. an adhesive to the piston 226 and the sleeve 222.

In FIG. 2B, the piston 226 cooperates with the housing 206, the sleeve 222, the connector assembly 224 and the piston seal 230 to define a chamber 262. The size and shape of the chamber 262 can be varied. Further, the pressure above the piston 226 is at atmospheric pressure and the pressure below the piston 226 is equal to the pressure in the chamber 262.

Additionally, the pendulum assembly 208 can include a pendulum support 264. In FIG. 2B, the pendulum support 264 flexibly connects and couples the sleeve 222 to the piston 226. In FIG. 2B, the pendulum support 264 includes a support beam 266 and a support damper 268. In this embodiment, the support beam 266 is a rigid beam and extends across the bottom of the sleeve 222. Further, the support damper 268 is resilient member that extends between the support beam 266 and the bottom of the piston 226. For example, the resilient member can be grommet that is made of rubber or another type of resilient material. With this design, the pendulum support 264 assists in supporting the weight of the sleeve 222, dampens and stabilizes motion of the sleeve 222 and allows for movement of the piston 226 relative to the sleeve 222. In one embodiment, the support damper 268 is positioned such that the bending axis of the support damper 268 coincides with the lower pivot axis (not shown) of the sleeve 222. In this case, a recess in the center of the piston 226 is required to properly position the support damper 268. This arrangement minimizes the impact of the support damper 268 stiffness on the pivoting resistance between the sleeve 222 and the piston 226. It should be noted that the size and materials used in the support damper 268 can be adjusted to adjust the characteristics of the pendulum support 264.

The materials utilized for the components of the vibration isolator 200 can be varied. For example, suitable materials for the housing 206, the sleeve 222, the piston 226, and the piston shaft 228 include steel or other rigid materials.

The fluid source 210 connected to the control system 28 is in fluid communication with the chamber 262 and is used to control the pressure in the chamber 262. The design of the fluid source 210 can be varied. As an example, the fluid source 210 can include one or more fluid pumps that are in fluid communication with the chamber 262. The control system 28 (illustrated in FIG. 1) actively controls the fluid source 210 to add and/or remove fluid from the chamber 262 so that a chamber pressure in the chamber 262 is greater than the atmospheric pressure above the piston 226. Stated another way, the pressure above the piston 226 is less than the pressure below the piston 226. The amount of differential between the chamber pressure and the atmospheric pressure can be varied. The pressure differential is typically between approximately 0 psi and 60 psi and more specifically between approximately 50 psi and 60 psi. With this design, the control system 28 can easily adjust the force and the height of the vibration isolator.

Figure 2C:
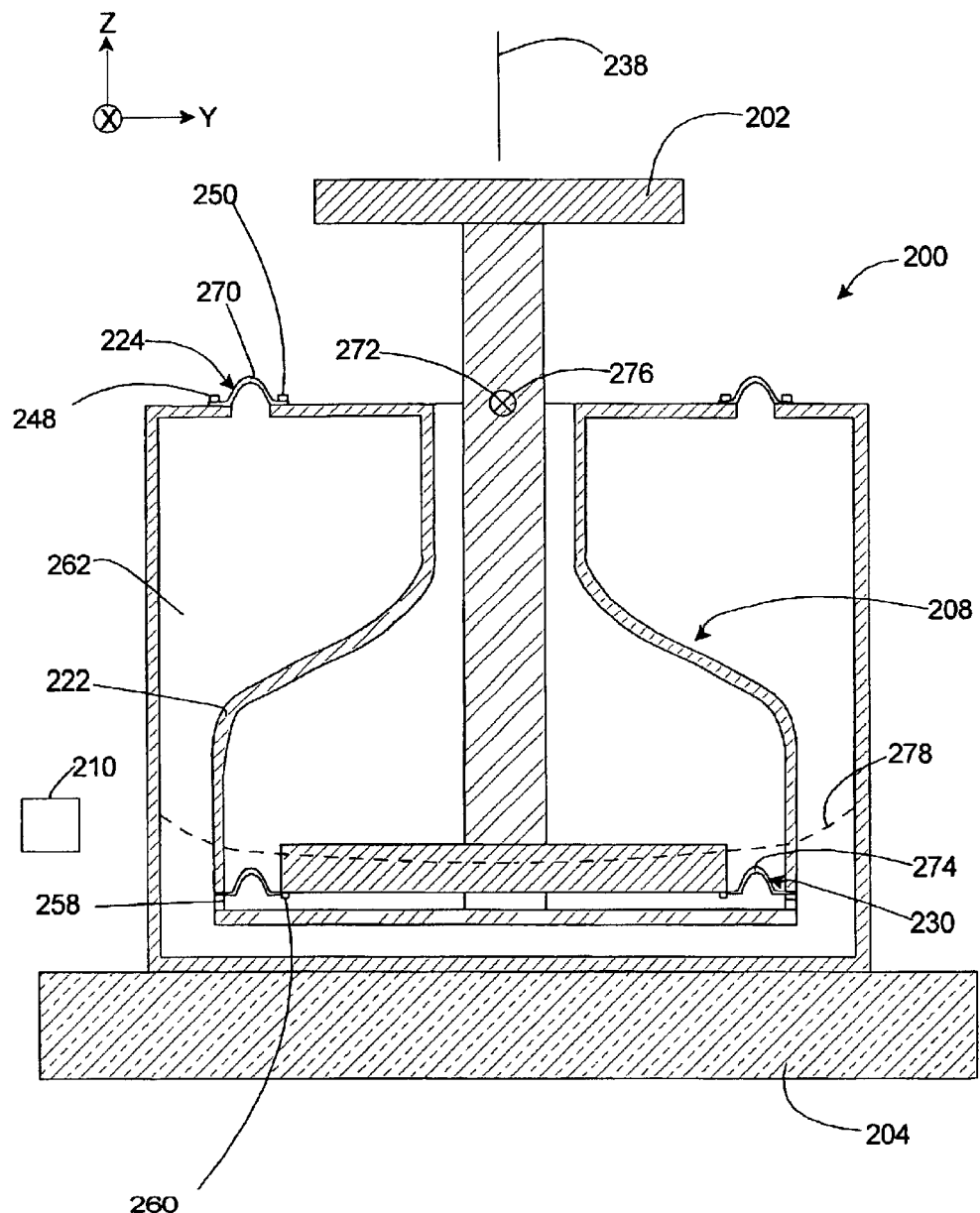
FIG. 2C is a side, cut-away illustration of the vibration isolator of FIG. 2A.

FIG. 2C is a side cut-away view of the vibration isolator 200, the first assembly 202 and the second assembly 204 of FIG. 2A. In this embodiment, the convolution of the seal of the connector assembly 224 defines a connector area of motion 270 of the connector assembly 224 that is generally annular shaped. The connector area of motion 270 is centered about a connector center point 272 that is positioned on the isolator axis 238. Further, the convolution of the piston seal 230 defines a seal area of motion 274 that is generally annular shaped and centered about the isolator axis 238.

FIG. 2C illustrates that the connector area of motion 270 and the seal area of motion 274 are positioned about the same axis and have approximately the same diameter. With this design, the pressure in the chamber 262 has approximately no net force on the sleeve 222.

In this embodiment, the pendulum assembly 208 moves and pivots about a movement axis 276 that is located at the connector center point 272. Further, the pendulum assembly 208 pivots along an arc shaped piston path 278 (illustrated as dashed line) relative to the movement axis 276. Further, the piston path 278 is below the movement axis 276 and the connector assembly 224, the movement axis 276 is closer than the piston path 278 to the first assembly 202, and the piston path 278 is closer than the movement axis 276 to the second assembly 204. Further, the pendulum assembly 208 pivots and moves about an axis of motion that is located approximately at the connector center point 272 and is coaxial with the connector area of motion 270.

It should be noted that when the pendulum assembly 208 swings and the piston 226 moves along the arc shaped piston path 278, there is approximately no influence on the pressure in the chamber 262. The pendulum length determines the swinging natural frequency, $W_n = \frac{1}{2\pi}\sqrt{g/l}$. Additionally, the piston 226 can also move independently in the Z direction. Further, it should be noted that the piston 226 moves along the Z axis and swings transversely relative to the Z axis.

Figure 3:
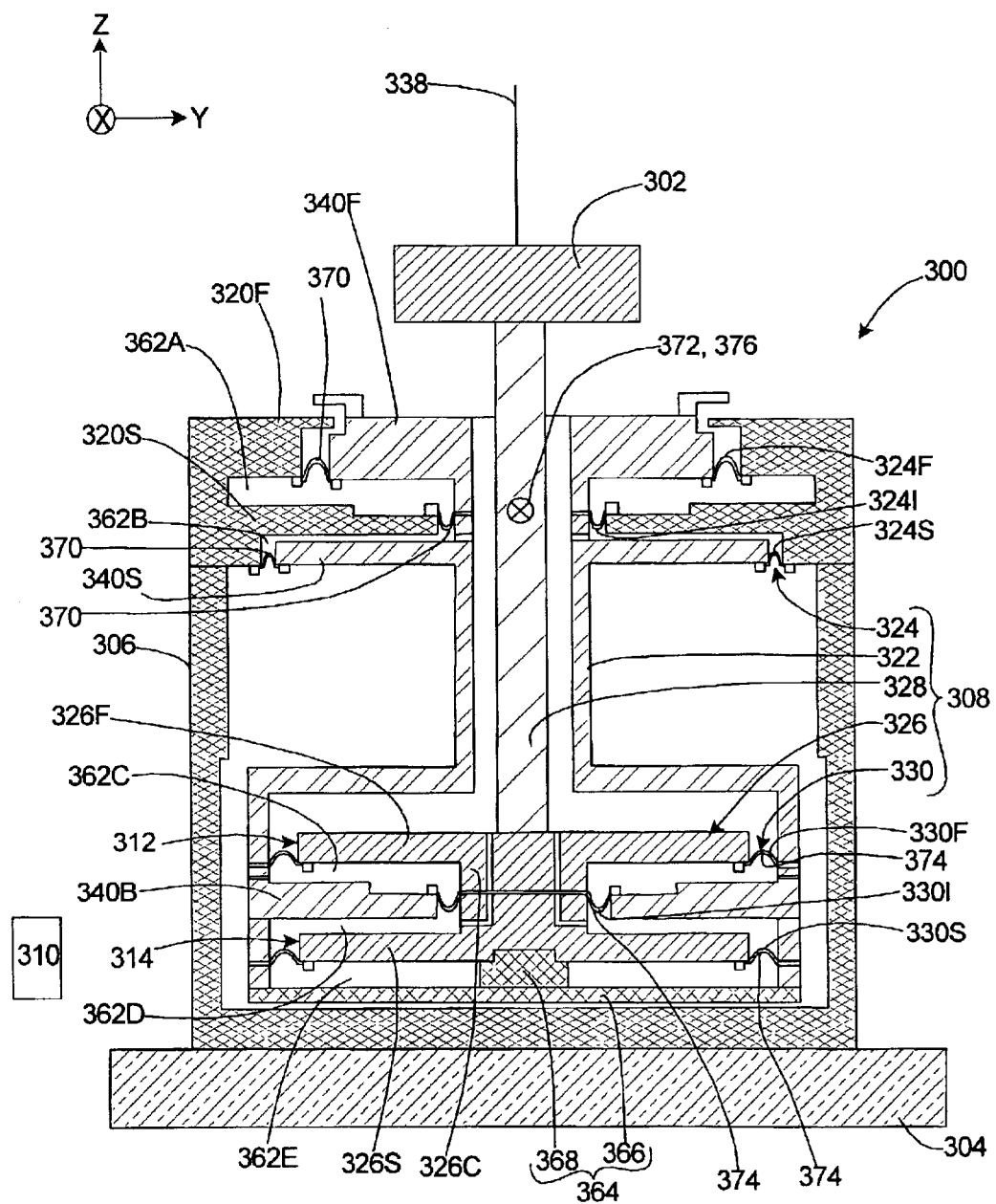
FIG. 3 is a side, cut-away illustration of another embodiment of a vibration isolator having features of the present invention.

FIG. 3 illustrates a side cut-away view of another embodiment of a vibration isolator 300 that can be used in the isolation systems 66, 68, 70, 72 of FIG. 1. The vibration isolator 300 supports at least a portion of a first assembly 302 relative to a second assembly 304. In this embodiment, the vibration isolator 300 includes a housing 306, a pendulum assembly 308, and a fluid source 310 that are somewhat similar to the corresponding components described above and illustrated in FIGS. 2A–2C. However, in this embodiment, these components cooperate to define a first system 312 and a second system 314 that concurrently support the first assembly 302 and allow for lateral movement of the first assembly 302 relative to the second assembly 304. In this embodiment, each system 312, 314 is a fluid type actuator and at least a part of each system 312, 314 moves laterally relative to the housing 306. The design of the components of the vibration isolator 300 can be varied to suit the intended use of the vibration isolator 300.

In FIG. 3, the housing 306 includes an annular shaped, housing first top wall 320F, and a spaced apart, annular shaped, housing second top wall 320S that is positioned below the housing first top wall 320F.

The pendulum assembly 308 allows for lateral movement and includes a sleeve 322, a connector assembly 324, a piston assembly 326, a piston shaft 328, and a piston seal assembly 330.

The sleeve 322 is somewhat similar to the sleeve 222 described above. However, in this embodiment, the sleeve 322 includes an annular shaped, sleeve first top wall 340F that is positioned near the top of the sleeve 222, an annular shaped, sleeve second top wall 340S that is spaced apart and positioned below the sleeve top first wall 340F, and an annular shaped, sleeve bottom wall 340B that is positioned near the bottom of the sleeve 222.

The connector assembly 324 secures and seals the sleeve 322 to the housing 306 and allows the sleeve 322 and the piston assembly 326 to pivot relative to the housing 306. In FIG. 3, the connector assembly 324 includes (i) a first connector 324F that secures and seals the housing first top wall 320F to the sleeve first top wall 340F, (ii) an intermediate connector 324I that secures and seals the housing second top wall 320S to the sleeve 322 intermediate the sleeve top walls 340F, 340S, and (iii) a second connector 324S that secures and seals the sleeve second top wall 340S to the housing 306. Each connector 324F, 324I, 324S can be a convoluted diaphragm seal.

The convolution defines a connector area of motion 370 for each connector 324F, 324I, 324S that is generally annular shaped. Each connector area of motion 370 is coaxial with the isolator axis 338 and each connector area of motion 370 is centered about a central point that is located on the isolator axis 338. The connector assembly 324 has a connector center point 372 that is coaxial with the isolator axis 338. The connector center point 372 is located on the isolator axis 338 approximately at the midpoint of the central points of the three connectors 324F, 324I, 324S along the isolator axis 338. Stated another way, the connector center point 372 is located on the isolator axis 338 at the average position along the Z axis of the central points of the connectors 324F, 324I, 324S.

Further, it should be noted that the pendulum assembly 308 and piston assembly 326 pivot and move about a movement axis 376 that is located approximately at the connector center point 372.

The piston assembly 326 is rigid and includes a disk shaped, first piston 326F, a spaced apart, disk shaped second piston 326S, and a cylindrical shaped, piston connector 326C that fixedly connects the pistons 326F, 326S together.

With this design, the pistons 326F, 326S concurrently move along the Z axis and swing laterally relative to the Z axis about the movement axis 376. Alternately, for example, the piston assembly 326 can include more than two pistons.

The piston seal assembly 330 secures and seals the piston assembly 326 to the sleeve 322. In FIG. 3, the piston seal assembly 330 includes (i) a first seal 330F that secures and seals the first piston 326F to the sleeve 322, (ii) a first intermediate seal 330I that secures and seals the piston connector 326C intermediate the pistons 326F, 326S to sleeve bottom wall 340B, and (iii) a second seal 330S that secures and seals the second piston 326S to the sleeve 322. Each seal 330F, 330I, 330S can be a convoluted diaphram seal.

The convolution defines a seal area of motion 374 for each seal that is generally annular shaped. The seal area of motion 374 for each seal is coaxial with the isolator axis 338.

The components cooperate so that the vibration isolator 300 includes five separate chambers. More specifically, moving top to bottom, the vibration isolator 300 includes (i) a first chamber 362A located between the sleeve first top wall 340F and the housing second top wall 320S, (ii) a second chamber 362B located between the housing second top wall 320S and the sleeve second top wall 340S, (iii) a third chamber 362C located between the first piston 326F and the sleeve bottom wall 340B, (iv) a fourth chamber 362D located between the sleeve bottom wall 340B and the second piston 326S, and (v) a fifth chamber 362E formed between the housing 306 and the pendulum assembly 308.

Of the five chambers, some of the chambers are at atmospheric pressure and some of chambers are maintained above atmospheric pressure using the fluid source 310. In FIG. 3, (i) the second chamber 362B and the fourth chamber 362D are at atmospheric pressure, and (ii) the first chamber 362A, the third chamber 362C and the fifth chamber 362E are in fluid communication with the fluid source 310 and are at pressure above atmospheric pressure. One or more of the first chamber 362A, the third chamber 362C, and the fifth chamber 362E can be in fluid communication with the same fluid source 310. Alternatively, (i) the first chamber 362A, the third chamber 362C, and the fifth chamber 362E can each have a separate fluid source and/or be at a different pressures. This design would allow for the individual control of the pressure in the chambers 362A, 362C, 362E.

The control system 28 (illustrated in FIG. 1) actively controls the fluid source 310 to control the pressure in the first chamber 362A, the third chamber 362C, and the fifth chamber 362E to adjust the force and the height of the vibration isolator 300. Further, pressure in the first chamber 362A and/or the second chamber 362B can be adjusted to change the position of the sleeve 322 along the Z axis.

With this design, (i) the pressure above the sleeve first top wall 340F is at atmospheric pressure while the pressure below the sleeve first top wall 340F is controlled to be greater than atmospheric pressure, (ii) the pressure above the sleeve second top wall 340S is at atmospheric pressure while the pressure below the sleeve second top wall 340S is controlled to be greater than atmospheric pressure, (iii) the pressure above the first piston 362F is at atmospheric pressure while the pressure below the first piston 362F is controlled to be greater than atmospheric pressure, and (iv) the pressure above the second piston 362S is at atmospheric pressure while the pressure below the second piston 362S is controlled to be greater than atmospheric pressure.

Additionally, the pendulum assembly 308 can include a pendulum support 364 that assists in supporting the weight of the sleeve 322, dampens and stabilizes motion of the sleeve 322 and allows for movement of the piston assembly 326 relative to the sleeve 322. In FIG. 3, the pendulum support 364 includes a support beam 366 and a support damper 368 that are similar to the corresponding components described above. In one embodiment, the support damper 368 is positioned such that the bending axis of the support damper 368 coincides with the lower pivot axis (not shown) of the sleeve 322. In this embodiment, a recess in the center of the piston assembly is required to properly position the support damper 368. This arrangement minimizes the impact of the damper 368 stiffness on the pivoting resistance between the sleeve 322 and the pistons 326F, 326S.

It should be noted in this embodiment, the sleeve 322 acts as a pendulum assembly that allows the vibration isolator 300 to have improved lateral stiffness. With this design, the vibration isolator 300 allows the first assembly 302 to move laterally relative to the second assembly 304. Further, the use of multiple pistons 326F, 326S allow for the vibration isolator 300 to have relatively large capacity with a relatively small footprint.

Figure 4:
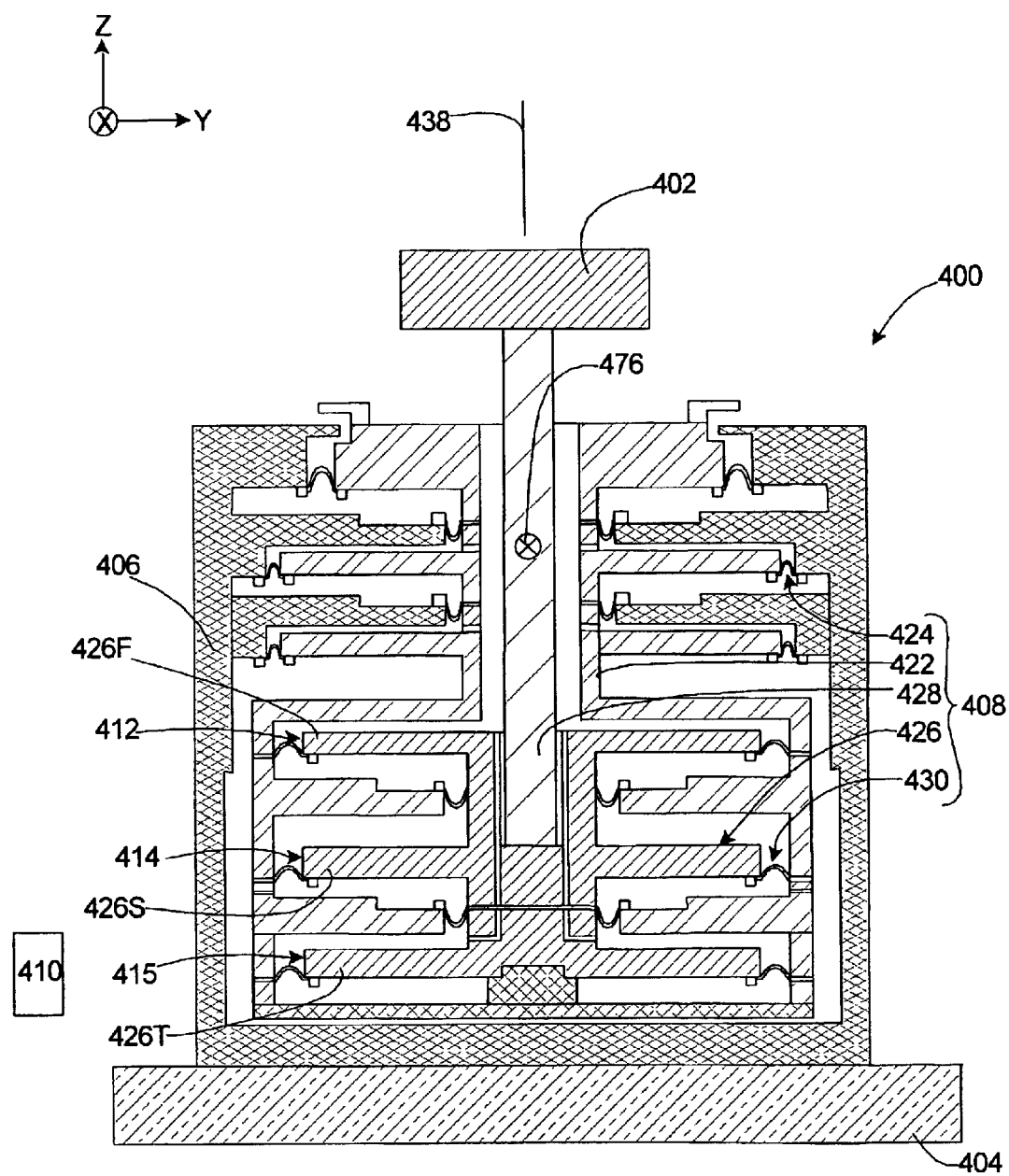
FIG. 4 is a side, cut-away illustration of yet another embodiment of a vibration isolator having features of the present invention.

FIG. 4 illustrates a side cut-away view of still another embodiment of a vibration isolator 400 that can be used in the isolation systems 66, 68, 70, 72 of FIG. 1. The vibration isolator 400 supports at least a portion of a first assembly 402 relative to a second assembly 404. In this embodiment, the vibration isolator 400 includes (i) a housing 406, (ii) a pendulum assembly 408 including a sleeve 422, a connector assembly 424, a piston assembly 426, a piston shaft 428, and a piston seal assembly 430, and (iii) a fluid source 410 that are somewhat similar to the corresponding components described above and illustrated in FIG. 3. However, in this embodiment, these components cooperate to define a first system 412, a second system 414, and a third system 415 that concurrently support the first assembly 402 and allow for lateral movement of the first assembly 402 relative to the second assembly 404. In this embodiment, each system 412, 414, 415 is a fluid type actuator and each system 412, 414, 415 moves laterally relative to the housing 406 and along the isolator axis 438.

In FIG. 4, the piston assembly 426 includes a first piston 426F, a second piston 426S and a third piston 426T that move concurrently along the Z axis and laterally relative to the Z axis about a movement axis 476.

The control system 28 (illustrated in FIG. 1) actively controls the fluid source 410 to control the pressure below the pistons 426F, 426S, 426T to adjust the force and the height of the vibration isolator 400 along the Z axis.

Figure 5:
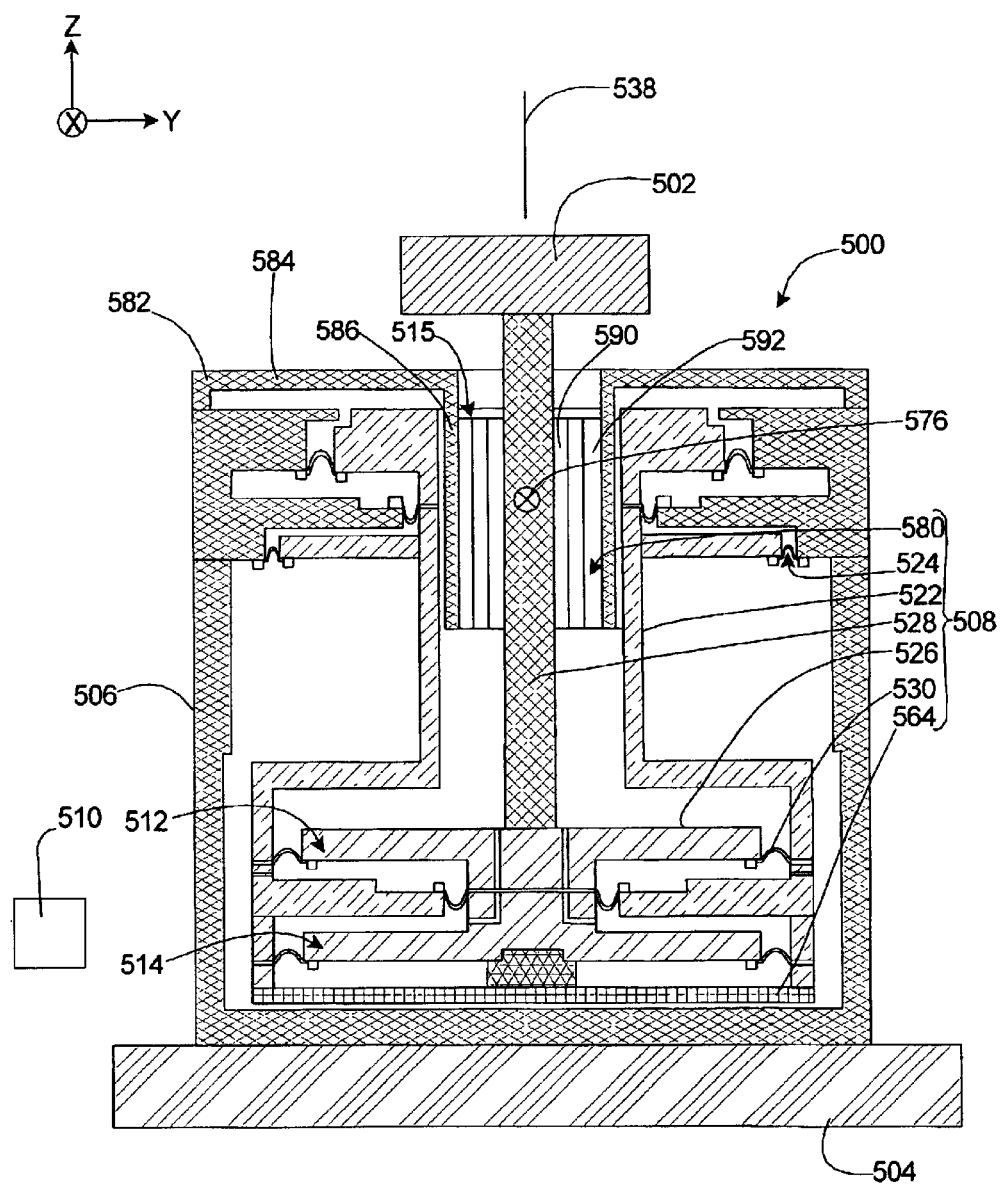
FIG. 5 is a side, cut-away illustration of still another embodiment of a vibration isolator having features of the present invention.

FIG. 5 illustrates a side cut-away view of another embodiment of a vibration isolator 500 that can be used in the isolation systems 66, 68, 70, 72 of FIG. 1. The vibration isolator 500 supports at least a portion of a first assembly 502 relative to a second assembly 504. In this embodiment, the vibration isolator 500 includes a housing 506, a pendulum assembly 508, and a fluid source 510 that are somewhat similar to the corresponding components described above and illustrated in FIG. 3. However, in this embodiment, vibration isolator 500 includes a first system 512, a second system 514 and a third system 515 that concurrently support the first assembly 502 and allow for lateral movement of the first assembly 502 relative to the second assembly 504. In this embodiment, the first system 512 and the second system 514 are fluid type actuators and the third system 515 is a mover 580. Further a portion of each system 512, 514, 515 moves along the Y axis laterally relative to the Z axis.

In FIG. 5, the housing 506 includes a mover support 582 that secures a portion of the mover 580 to the housing 506.

In FIG. 5, the mover support 582 includes an annular shaped section 584 that extends inward and a tubular shaped section 586 that extends downward into the pendulum assembly 508.

The pendulum assembly 508 allows for lateral movement and includes a sleeve 522, a connector assembly 524, a piston assembly 526, a piston shaft 528, a piston seal assembly 530 and a pendulum support 564 that are somewhat similar to the corresponding components described above and illustrated in FIG. 3. In this embodiment, the piston assembly 526 includes two pistons. However, the vibration isolator 500 could be designed with less than two or more than two pistons.

In FIG. 5, the mover 580 is coupled to the piston assembly 526 and moves the piston assembly 526 relative to the second assembly 504 along the Z axis and the isolator axis 538. The design of the mover 580 can be varied. For example, the mover 580 can include one or more rotary motors, voice coil motors, linear motors, electromagnetic actuators, or some other force actuators. In FIG. 5, the mover 580 is a non-commutated, linear motor, commonly referred to as a voice coil motor. The mover 580 includes (i) a first mover component 590 that is secured to the piston shaft 528 and (ii) an adjacent second mover component 592 that interacts with the first mover component 590, the second mover component 592 being secured and coupled to the housing 506 via the mover support 582.

For the mover 580, one of the mover components 590, 592 includes one or more magnets and the other mover component 590, 592 includes one or more conductors. In this embodiment, the first mover component 590 includes a tubular shaped array of conductors, while the second mover component 592 includes a tubular shaped array of magnets. Alternately, for example, the first mover component 590 could include one or more magnet arrays while the second mover component 592 could include one or more conductor arrays.

The control system 28 is connected to the fluid source 510 and the conductor arrays. The control system 28 (illustrated in FIG. 1) actively controls the fluid source 510 to control the pressure below the pistons to adjust the force and the height of the vibration isolator 500. Additionally, electrical current (not shown) is supplied to the conductor array by the control system 28 (illustrated in FIG. 1). The electrical current interacts with a magnetic field (not shown) generated by one or more of the magnets. This causes a force (Lorentz force) between the conductor and the magnets. The required stroke of the mover 580 can vary. It is anticipated that the required stroke of the mover 580 is between approximately 2 mm and 15 mm. However, larger or smaller strokes can be utilized.

It should be noted that the first system 512 and the second system 514 can be designed to carry the majority of the load. For example, the systems 512, 514 can carry at least approximately 70%, at least approximately 80%, at least approximately 95%, or at least approximately 100% of the load. Alternately, the third system 515 can carry approximately only 30%, approximately only 20%, approximately only 5%, or approximately 0% of the load.

FIG. 5 illustrates that the movement axis 576 of the pendulum assembly 508 is centered about the center of the connector assembly 524.

Figure 6A:
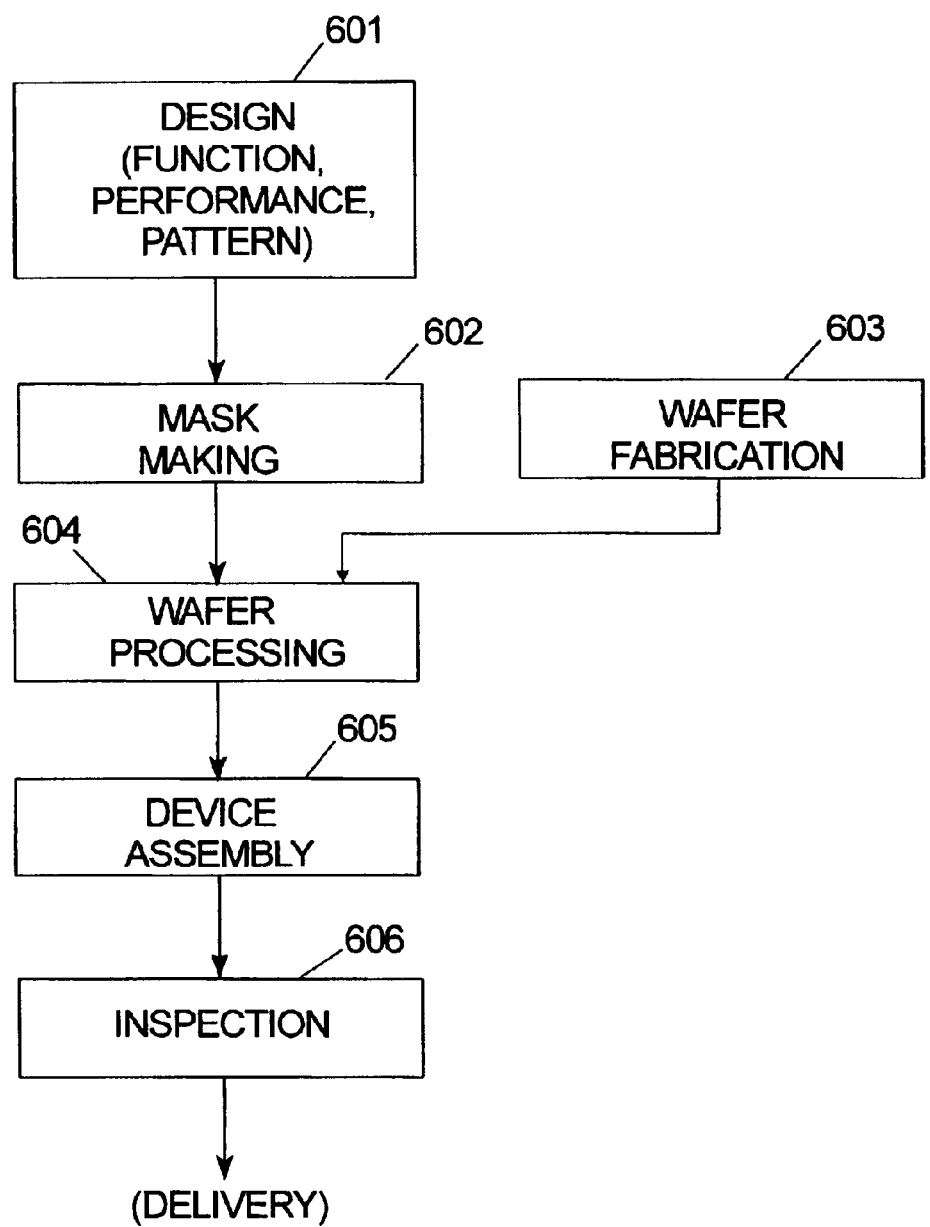
FIG. 6A is a flow chart that outlines a process for manufacturing a device in accordance with the present invention.

Further, semiconductor devices can be fabricated using the above described systems, by the process shown generally in FIG. 6A. In step 601, the device's function and performance characteristics are designed. Next, in step 602, a mask (reticle) having a pattern is designed according to the previous designing step, and in a parallel step 603, a wafer is made from a silicon material. The mask pattern designed in step 602 is exposed onto the wafer from step 603 in step 604 by a photolithography system described hereinabove in accordance with the present invention. In step 605, the semiconductor device is assembled (including the dicing process, bonding process and packaging process), finally, the device is then inspected in step 606.

Figure 6B:
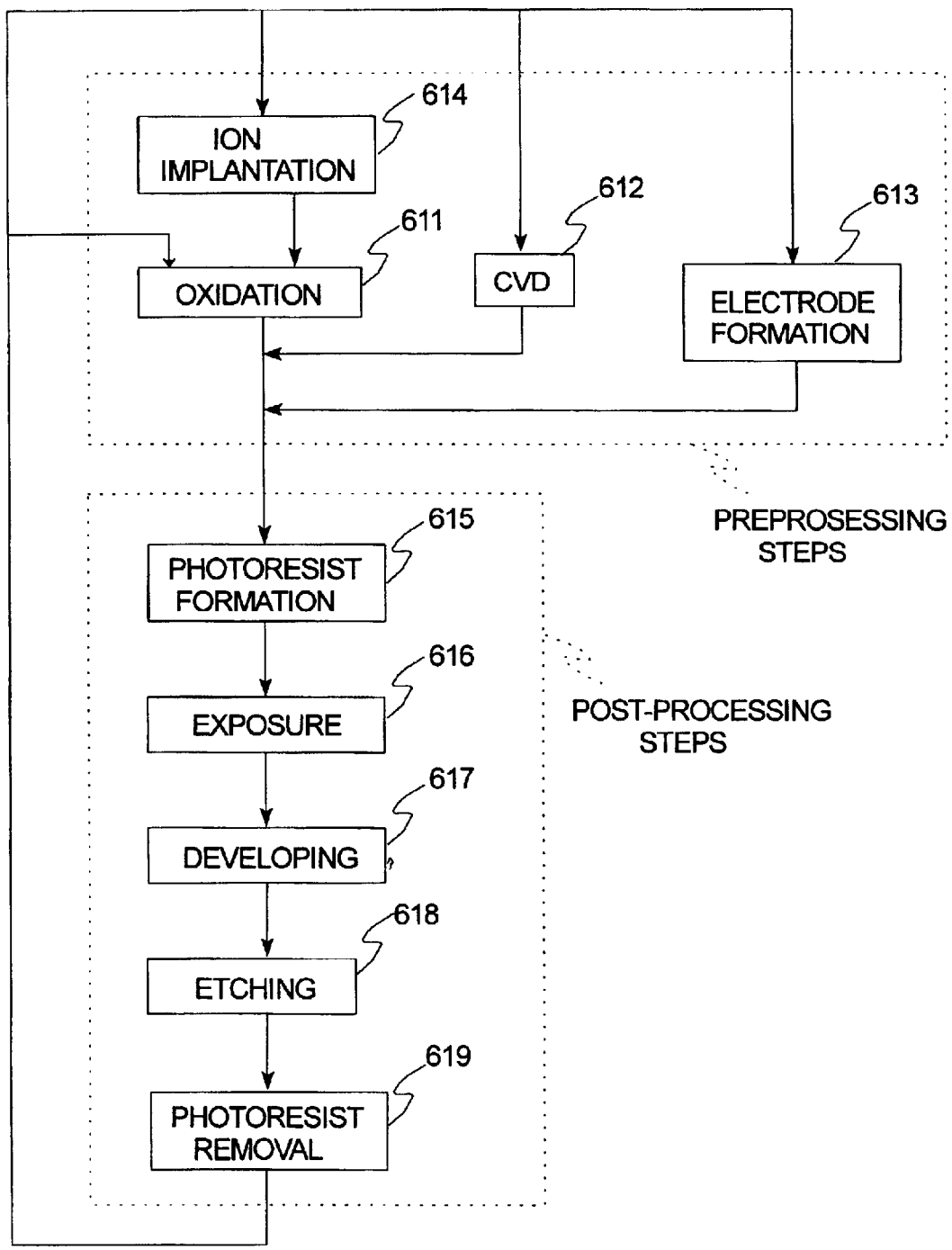
FIG. 6B is a flow chart that outlines device processing in more detail.

FIG. 6B illustrates a detailed flowchart example of the above-mentioned step 604 in the case of fabricating semiconductor devices. In FIG. 6B, in step 611 (oxidation step), the wafer surface is oxidized. In step 612 (CVD step), an insulation film is formed on the wafer surface. In step 613 (electrode formation step), electrodes are formed on the wafer by vapor deposition. In step 614 (ion implantation step), ions are implanted in the wafer. The above mentioned steps 611–614 form the preprocessing steps for wafers during wafer processing, and selection is made at each step according to processing requirements.

At each stage of wafer processing, when the above-mentioned preprocessing steps have been completed, the following post-processing steps are implemented. During post-processing, first, in step 615 (photoresist formation step), photoresist is applied to a wafer. Next, in step 616 (exposure step), the above-mentioned exposure device is used to transfer the circuit pattern of a mask (reticle) to a wafer. Then, in step 617 (developing step), the exposed wafer is developed, and in step 618 (etching step), parts other than residual photoresist (exposed material surface) are removed by etching. In step 619 (photoresist removal step), unnecessary photoresist remaining after etching is removed. Multiple circuit patterns are formed by repetition of these preprocessing and post-processing steps.

While the particular vibration isolator and exposure apparatus as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A vibration isolator that at least partly isolates a first assembly from vibration from a second assembly along a first axis, the vibration isolator comprising:
   a housing that is secured to the second assembly;
   a sleeve positioned within the housing;
   a connector assembly that flexibly connects the sleeve to the housing and allows the sleeve to move relative to the housing substantially transverse to the first axis;
   a first piston that is coupled to the first assembly;
   a first piston seal that seals the first piston to the sleeve; and
   a pendulum support including a resilient member that flexibly connects the sleeve to the first piston.

2. The vibration isolator of claim 1 wherein the pendulum support includes a support beam that extends across the sleeve and the resilient member flexibly connects the support beam to the first piston.

3. The vibration isolator of claim 1 wherein during lateral movement of the first assembly, the first piston moves laterally relative to the first axis along a substantially arc shaped path.

4. The vibration isolator of claim 1 further comprising a fluid source that adjusts the pressure of a first fluid that acts upon the first piston to move the first piston along the first axis.

5. The vibration isolator of claim 1 wherein the connector assembly includes a connector center point located along the first axis and the first piston swings relative to the housing about a movement axis that is located near the connector center point.

6. The vibration isolator of claim 5 wherein the movement axis is positioned between the first assembly and the second assembly.

7. The vibration isolator of claim 5 wherein the connector assembly includes a connector area of motion that is annular shaped and the movement axis is positioned at approximately the center of the connector area of motion.

8. The vibration isolator of claim 7 wherein the first piston seal includes a seal area of motion that is annular shaped, wherein the connector area of motion has a diameter that is approximately equal to a diameter of the seal area of motion.

9. The vibration isolator of claim 8 wherein the connector area of motion is substantially coaxial with the seal area of motion.

10. A vibration isolator that at least partly isolates a first assembly from vibration from a second assembly along a first axis, the vibration isolator comprising:
a housing that is secured to the second assembly;
a sleeve positioned within the housing;
a connector assembly that flexibly connects the sleeve to the housing and allows the sleeve to move relative to the housing substantially transverse to the first axis;
a first piston that is coupled to the first assembly;
a first piston seal that seals the first piston to the sleeve;
a pendulum support that flexibly connects the sleeve to the first piston; and
a second piston that is coupled to the first piston, wherein the pistons move concurrently laterally relative to the first axis.

11. The vibration isolator of claim 10 wherein the pistons move concurrently along the first axis.

12. The vibration isolator of claim 10 further comprising a fluid source that controls the pressure that acts on each piston.

13. The vibration isolator of claim 10 wherein the connector assembly includes a first connector and a second connector, each connector being centered about a central point that is located along the first axis and wherein the pistons pivot relative to the housing about a movement axis that is located along the first axis between the central points of the connectors.

14. A vibration isolator that at least partly isolates a first assembly from vibration from a second assembly along a first axis, the vibration isolator comprising:
a housing that is secured to the second assembly;
a sleeve positioned within the housing;
a connector assembly that flexibly connects the sleeve to the housing and allows the sleeve to move relative to the housing substantially transverse to the first axis;
a first piston that is coupled to the first assembly;
a first piston seal that seals the first piston to the sleeve;
a pendulum support that flexibly connects the sleeve to the first piston; and
a mover that moves the first piston relative to the housing.

15. The vibration isolator of claim 14 wherein the mover includes a first mover component coupled to the first piston, and a second mover component coupled to the housing.

16. The vibration isolator of claim 15 wherein the first mover component moves concurrently with the first piston laterally relative to the first axis and along the first axis.

17. The vibration isolator of claim 15 wherein one of the mover components includes a magnet and the other mover component includes a conductor.

18. The vibration isolator of claim 15 wherein the pendulum assembly includes a piston shaft that couples the first piston to the first assembly, and wherein the first mover component is secured to the piston shaft.

19. An isolation system including the vibration isolator of claim 1.

20. An exposure apparatus including the isolation system of claim 19.

21. A device manufactured with the exposure apparatus according to claim 20.

22. A wafer on which an image has been formed by the exposure apparatus of claim 20.

23. A vibration isolator that at least partly isolates a first assembly from vibration from a second assembly along a first axis, the vibration isolator comprising:
a housing that is secured to the second assembly;
a pendulum assembly coupled to the housing, the pendulum assembly including a first piston and a second piston that are coupled to the first assembly and a connector assembly that allows the pistons to move concurrently laterally relative to the first axis; and
a fluid source that adjusts the pressure of a first fluid that acts upon the first piston and a second fluid that acts upon the second piston.

24. The vibration isolator of claim 23 wherein the pistons move concurrently along the first axis.

25. The vibration isolator of claim 23 wherein the fluid source controls the pressure below each piston.

26. The vibration isolator of claim 23 wherein the connector assembly includes a first connector and a second connector, each connector being centered about a central point that is located along the first axis and wherein the pistons pivot relative to the housing about a movement axis that is located along the first axis between the central points of the connectors.

27. The vibration isolator of claim 23 wherein the pendulum assembly further comprises a sleeve positioned within the housing, and a seal assembly that seals the pistons to the sleeve, and wherein the connector assembly flexibly connects the sleeve to the housing and allows the sleeve to move relative to the housing substantially transverse to the first axis.

28. The vibration isolator of claim 27 further comprising a pendulum support that flexibly connects the sleeve to the pistons.

29. The vibration isolator of claim 28 wherein the pendulum support includes a support beam that extends across the sleeve and a resilient member that flexibly connects the support beam to at least one of the pistons.

30. The vibration isolator of claim 23 wherein the pendulum assembly further comprises a third piston that is coupled to the first piston and the second piston, and wherein the connector assembly allows the first piston, the second piston and the third piston to swing concurrently laterally relative to the first axis.

31. The vibration isolator of claim 23 wherein the first fluid and the second fluid are at the same pressure.

32. An isolation system including the vibration isolator of claim 23.

33. An exposure apparatus including the isolation system of claim 32.

34. A device manufactured with the exposure apparatus according to claim 33.

35. A wafer on which an image has been formed by the exposure apparatus of claim 33.

36. A vibration isolator that at least partly isolates a first assembly from vibration from a second assembly along a first axis, the vibration isolator comprising:
a housing that is secured to the second assembly;
a pendulum assembly coupled to the housing, the pendulum assembly including a first piston that is coupled to the first assembly and a connector assembly that allows the first piston to swing substantially laterally relative to the first axis, the first piston including a first side and a second side;
a mover that is coupled to the first piston, the mover moving the first piston relative to the housing along the first axis; and
a fluid source that adjusts the pressure of a fluid that acts upon the first side of the first piston without acting on the second side to move the piston along the first axis.

37. A vibration isolator that at least partly isolates a first assembly from vibration from a second assembly along a first axis, the vibration isolator comprising:
a housing that is secured to the second assembly;
a pendulum assembly coupled to the housing, the pendulum assembly including a first piston that is coupled to the first assembly and a connector assembly that allows the first piston to swing substantially laterally relative to the first axis;
a mover that is coupled to the first piston, the mover moving the first piston relative to the housing along the first axis, wherein the mover includes a first mover component coupled to the first piston, and a second mover component coupled to the housing; and
a fluid source that adjusts the pressure of a fluid that acts upon the first piston to move the piston along the first axis.

38. The vibration isolator of claim 37 wherein the first mover component moves concurrently with the first piston laterally relative to the first axis and along the first axis.

39. The vibration isolator of claim 37 wherein one of the mover components includes a magnet and the other mover component includes a conductor.

40. The vibration isolator of claim 37 wherein the pendulum assembly includes a piston shaft that couples the first piston to the first assembly, and wherein the first mover component is secured to the piston shaft.

41. The vibration isolator of claim 36 wherein the connector assembly includes a connector center point located along the first axis and the first piston swings relative to the housing about a movement axis that is located near the connector center point.

42. The vibration isolator of claim 36 further comprising a second piston that is coupled to the first piston, wherein the pistons move concurrently laterally relative to the first axis, and the pistons move concurrently along the first axis.

43. A vibration isolator that at least partly isolates a first assembly from vibration from a second assembly along a first axis, the vibration isolator comprising:
a housing that is secured to the second assembly;
a pendulum assembly coupled to the housing, the pendulum assembly including a first piston that is coupled to the first assembly and a connector assembly that allows the first piston to swing substantially laterally relative to the first axis, wherein the pendulum assembly further comprises a sleeve positioned within the housing, and a seal assembly that seals the first piston to the sleeve, and wherein the connector assembly flexibly connects the sleeve to the housing and allows the sleeve to move relative to the housing substantially transverse to the first axis;
a mover that is coupled to the first piston, the mover moving the first piston relative to the housing along the first axis; and
a fluid source that adjusts the pressure of a fluid that acts upon the first piston to move the piston along the first axis.

44. The vibration isolator of claim 43 further comprising a pendulum support that flexibly connects the sleeve to the first piston.

45. An isolation system including the vibration isolator of claim 36.

46. An exposure apparatus including the isolation system of claim 45.

47. A device manufactured with the exposure apparatus according to claim 46.

48. A wafer on which an image has been formed by the exposure apparatus of claim 46.

49. A vibration isolator that at least partly isolates a first assembly from vibration from a second assembly along a first axis, the vibration isolator comprising:
a housing that is secured to the second assembly;
a pendulum assembly including a shaft that is secured to the first assembly and a connector assembly that connects the shaft to the housing and allows the shaft to swing substantially laterally relative to the first axis; and
a mover including a first mover component secured to the shaft and a second mover component that is secured to the housing.

50. The vibration isolator of claim 49 wherein the pendulum assembly includes a piston that is secured to the shaft.

51. The vibration isolator of claim 50 wherein the piston moves concurrently with the first mover component laterally relatively to the first axis and along the first axis.

52. The vibration isolator of claim 51 further comprising a fluid source that adjusts the pressure of a fluid that acts upon the piston to move the piston along the first axis.

53. The vibration isolator of claim 49 wherein one of the mover components includes a magnet and the other mover component includes a conductor.

54. The vibration isolator of claim 49 wherein the connector assembly includes a connector center point located along the first axis and the first mover component swings relative to the housing about a movement axis that is located near the connector center point.

55. The vibration isolator of claim 54 wherein the movement axis is positioned along the first axis between a central point of the first assembly and a central point of the second assembly.

56. An isolation system including the vibration isolator of claim 49.

57. An exposure apparatus including the isolation system of claim 56.

58. A device manufactured with the exposure apparatus according to claim 57.

59. A wafer on which an image has been formed by the exposure apparatus of claim 57.

60. A method for making a vibration isolator for isolating a first assembly from vibration from a second assembly along a first axis, the method comprising the steps of:
providing a housing that is secured to the second assembly;
positioning a sleeve within the housing;
flexibly connecting the sleeve to the housing with a connector assembly that allows the sleeve to move relative to the housing substantially transverse to the first axis;
coupling a first piston to the first assembly;
sealing the first piston to the sleeve with a first seal; and
flexibly connecting the sleeve to the first piston with a resilient member of a pendulum support.

61. The method of claim 60 wherein the step of flexibly connecting includes the step of providing a support beam that extends across the sleeve and the resilient member flexibly connects the support beam to the first piston.

62. The method of claim 60 wherein during lateral movement of the first assembly, the first piston moves laterally relative to the first axis along a substantially arc shaped path.

63. The method of claim 60 further comprising the step of adjusting the pressure of a first fluid that acts upon the first piston to move the first piston along the first axis.

64. A method for making a vibration isolator for isolating a first assembly from vibration from a second assembly along a first axis, the method comprising the steps of:
providing a housing that is secured to the second assembly;
positioning a sleeve within the housing;
flexibly connecting the sleeve to the housing with a connector assembly that allows the sleeve to move relative to the housing substantially transverse to the first axis;
coupling a first piston to the first assembly;
sealing the first piston to the sleeve with a first seal;
flexibly connecting the sleeve to the first piston with a pendulum support; and
coupling a second piston to the first piston, wherein the pistons move concurrently laterally relative to the first axis and wherein the pistons move concurrently along the first axis.

65. The method of claim 60 further comprising the step of moving the first piston relative to the housing with a mover.

66. A method for making a vibration isolator for isolating a first assembly from vibration from a second assembly along a first axis, the method comprising the steps of:
providing a housing that is secured to the second assembly;
positioning a sleeve within the housing;
flexibly connecting the sleeve to the housing with a connector assembly that allows the sleeve to move relative to the housing substantially transverse to the first axis;
coupling a first piston to the first assembly;
sealing the first piston to the sleeve with a first seal;
flexibly connecting the sleeve to the first piston with a pendulum support; and
moving the first piston relative to the housing with a mover, wherein the step of moving includes the step of coupling a first mover component to the first piston, and coupling a second mover component to the housing.

67. The method of claim 66 wherein the first mover component moves concurrently with the first piston laterally relative to the first axis and along the first axis.

68. A method for making an isolation system including the step of providing a vibration isolator made in accordance with claim 60.

69. A method for providing an exposure apparatus including the step of providing a first assembly, providing a second assembly, and securing the first assembly to the second assembly with a vibration isolator made by the method of claim 60.

70. A method of making a wafer utilizing the exposure apparatus made by the method of claim 69.

71. A method of making a device including at least an exposure process, wherein the exposure process utilizes the exposure apparatus made by the method of claim 69.

72. A method for making a vibration isolator for isolating a first assembly from vibration from a second assembly along a first axis, the method comprising the steps of:
providing a housing that is secured to the second assembly;
coupling a first piston and a second piston to the first assembly;
connecting the pistons to the housing with a connector assembly that allows the pistons to move concurrently laterally relative to the first axis; and
adjusting the pressure of a first fluid that acts upon the first piston and a second fluid that acts upon the second piston with a fluid source to move the pistons concurrently along the first axis.

73. The method of claim 72 wherein during lateral movement of the first assembly, the pistons move concurrently along a substantially arc shaped path.

74. The method of claim 72 further comprising the step of moving the pistons relative to the housing with a mover.

75. The method of claim 74 wherein the step of moving includes the step of coupling a first mover component to the pistons, and coupling a second mover component to the housing.

76. The method of claim 75 wherein the first mover component moves concurrently with the pistons laterally to the first axis and along the first axis.

77. A method for making an isolation system including the step of providing a vibration isolator made in accordance with claim 72.

78. A method for providing an exposure apparatus including the step of providing a first assembly, providing a second assembly, and securing the first assembly to the second assembly with a vibration isolator made by the method of claim 72.

79. A method of making a wafer utilizing the exposure apparatus made by the method of claim 78.

80. A method of making a device including at least an exposure process, wherein the exposure process utilizes the exposure apparatus made by the method of claim 78.

81. A method for making a vibration isolator for isolating a first assembly from vibration from a second assembly along a first axis, the method comprising the steps of:
providing a housing that is secured to the second assembly; securing a shaft to the first assembly;
flexibly connecting the shaft to the housing with a connector assembly that allows the shaft to swing substantially laterally relative to the first axis; and
providing a mover having a first mover component secured to the shaft and a second mover component that is secured to the housing, the mover components interacting to move the shaft relative to the housing along the first axis.

82. The method of claim 81 further comprising the step of coupling a piston to the piston shaft, wherein during lateral movement of the first assembly, the first piston and the first mover component move concurrently laterally relative to the first axis.

83. The method of claim 81 wherein one of the mover components includes a magnet and the other mover component includes a conductor.

84. A method for making an isolation system including the step of providing a vibration isolator made in accordance with claim 81.

85. A method for providing an exposure apparatus including the step of providing a first assembly, providing a second assembly, and securing the first assembly to the second assembly with a vibration isolator made by the method of claim 81.

86. A method of making a wafer utilizing the exposure apparatus made by the method of claim 85.

87. A method of making a device including at least an exposure process, wherein the exposure process utilizes the exposure apparatus made by the method of claim 85.

* * * * *

UNITED STATES PATENT AND TRADEMARK OFFICE
CERTIFICATE OF CORRECTION

PATENT NO. : 6,953,109 B2
DATED : October 11, 2005
INVENTOR(S) : Watson et al.

It is certified that error appears in the above-identified patent and that said Letters Patent is hereby corrected as shown below:

Title page,
Item [56], References Cited, U.S. PATENT DOCUMENTS, add:
-- 6,570,298    5/2003  Yasuda --.

Column 21,
Line 7, between "fluid" and "that" insert -- from a fluid source --.

Signed and Sealed this

Thirty-first Day of January, 2006

JON W. DUDAS
*Director of the United States Patent and Trademark Office*